(12) United States Patent
Johnson

(10) Patent No.: US 7,281,381 B2
(45) Date of Patent: Oct. 16, 2007

(54) MECHANICAL-THERMAL SOLAR POWER SYSTEM

(75) Inventor: D. Alan E. Johnson, 3 Wells St. #1, Enfield, NH (US) 03748

(73) Assignee: D. Alan E. Johnson, Wilder, VT (US)

( * ) Notice: Subject to any disclaimer, the term of this patent is extended or adjusted under 35 U.S.C. 154(b) by 817 days.

(21) Appl. No.: 10/646,056

(22) Filed: Aug. 22, 2003

(65) Prior Publication Data
US 2005/0039791 A1 Feb. 24, 2005

(51) Int. Cl.
*F03G 6/06* (2006.01)
*H01M 8/06* (2006.01)

(52) U.S. Cl. ............ 60/641.15; 60/641.8; 429/21

(58) Field of Classification Search ........... 60/641.15, 60/641.8; 126/569–713; 429/12–46
See application file for complete search history.

(56) References Cited

U.S. PATENT DOCUMENTS

| | | | | |
|---|---|---|---|---|
| 4,282,858 A | * | 8/1981 | Bowers, Jr. | 126/574 |
| 4,354,117 A | * | 10/1982 | Abernathy | 290/1 R |
| 4,424,801 A | * | 1/1984 | Mori | 126/578 |
| 4,841,946 A | * | 6/1989 | Marks | 126/618 |
| 5,924,287 A | * | 7/1999 | Best | 60/643 |

\* cited by examiner

*Primary Examiner*—Nam Nguyen
*Assistant Examiner*—Jeffrey Barton
(74) *Attorney, Agent, or Firm*—Anthony Edw. Campbell

(57) ABSTRACT

A mechanical thermo-voltaic solar power system (MeTSo-PoS) that uses a mechanical generator, instead of the photovoltaic panel commonly in use today, is disclosed. The system is comprised of three major subsystems: (1) a light collector array, (2) a mechanical thermo-voltaic generator, and (3) a storage and retrieval system. At the center of the system is the light collection array comprised of solar collector elements. These collector elements are connected to optical conduits (fiber optic cables) that carry the light energy to a mechanical generator. An automatic aiming system is used to align the collector elements directly at a light source for maximum light output. Each light collector element is comprised of a set of lenses that focus a larger area of light down to a point small enough to inject into an optical conduit. The optical conduit is then used to carry the light from each collector element to the generator. The system can use either a steam turbine or a Stirling engine type of mechanical generator, which is connected to a standard AC generator for generating electrical power. The heating chamber involves an outer shell where the optical conduits attach and allows the light to shine through to the heating area of either the boiler of a steam turbine or the hot node of a Stirling engine. Additionally, a small hole is provided in the bottom of the heating chamber where a gas burner is mounted to provide an auxiliary means of providing heat to the system. The burner can be fueled by natural gas or from stored hydrogen from the system. Electricity from the system that is not used immediately is redirected to a storage unit, such as a bank of batteries. In the system, electricity can be taken directly form the generator or can be used to charge the batteries and taken from them when needed. The overall system has a means of monitoring the amount of energy being generated and if that is less than is being used for auto aiming and other nonessential functions, it will shut down those functions and switch into energy retrieval mode.

11 Claims, 4 Drawing Sheets

MECHANICAL-THERMAL SOLAR POWER SYSTEM

BACKGROUND OF THE INVENTION

1. Field of the Invention

The present invention relates to a mechanical thermo-voltaic solar power system for use in connection with home, business, and industrial power generation. The mechanical thermo-voltaic solar power system has particular utility in connection with generating power in a cleaner, safer, and more efficient way.

2. Description of the Prior Art

Clean and efficient power generation is a growing concern in today's world. As the demand for more electricity to supply homes, businesses, and industry there is a continuing effort to also protect the environment. Although photovoltaic solar power generation is making strides towards providing cleaner power, there is the need towards improving the efficiency of such power generation. The use of thermo-voltaic solar power collectors coupled with steam turbines or Stirling engines have the potential to provide such needed improvements in power generation efficiency.

The use of thermo-voltaic power generators is known in the prior art. For example, U.S. Pat. No. 5,228,293 to Vitale discloses a low temperature solar-to-electric power conversion system, which uses a dish-type solar collector to heat a transport fluid that supplies a Stirling engine to provide electric power and hot water. However, the Vitale '293 patent is different in structure from the present invention and does not use a solar collector array and optical conduits for collecting and transporting the solar energy to the Stirling engine. Additional, the patent does not disclose an automatic light collector-aiming feature for maximizing the overall efficiency of the system.

U.S. Pat. No. 4,707,990 to Meijer also discloses a solar powered Stirling engine, which uses a dish-type solar collector in combination with a Stirling engine to provide electric power. In this patent emphasis is placed on aiming the collection disc to maintain maximum efficiency throughout the yearly seasons. However, the Meijer '990 patent is different in structure from the present invention and does not use a solar collector array and optical conduits for collecting and transporting the solar energy to the Stirling engine.

Similarly, U.S. Pat. No. 4,586,334 to Nilsson et al. discloses a solar energy power generation system, which uses a dish-type solar collector in combination with a Stirling engine to provide electric power. However, the Nilsson '334 patent is different in structure from the present invention and does not use a solar collector array and optical conduits for collecting and transporting the solar energy to the Stirling engine.

Lastly, U.S. Pat. No. 5,973,825 to Lasich, U.S. Pat. No. 4,642,988 to Benson, and U.S. Pat. No. 5,735,123 to Ehrig disclose apparatus that may be of general interest and pertinent to the construction and design of the present invention. The Lasich '825 patent discloses a high efficiency method for the production of hydrogen from solar radiation. The Benson '988 patent discloses a solar powered free-piston Stirling engine. Finally, the Ehrig '123 patent discloses an engery generating system, primarily for use in with satellites and space stations. However, all of these patents disclose apparatus that is different in structure from the present invention and do not use a solar collector array and optical conduits for collecting and transporting the solar energy to a mechanical generator.

While the above-described devices fulfill their respective, particular objectives and requirements, the aforementioned patents do not describe a mechanical thermo-voltaic solar power system that uses a solar array panel light collector. Therefore, a need exists for a new and improved mechanical thermo-voltaic solar power system that can be used for generating high efficiency electrical power. In this regard, the present invention substantially fulfills this need. In this respect, the mechanical thermo-voltaic solar power system according to the present invention substantially departs from the conventional concepts and designs of the prior art, and in doing so provides an apparatus primarily developed for the purpose of generating high efficiency electrical power.

SUMMARY OF THE INVENTION

In view of the foregoing disadvantages inherent in the known types of thermo-voltaic solar power systems now present in the prior art, the present invention provides an improved mechanical thermo-voltaic solar power system, and overcomes many of the above-mentioned disadvantages and drawbacks of the prior art. As such, the general purpose of the present invention, which will be described subsequently in greater detail, is to provide a new and improved thermo-voltaic solar power system that has all the advantages of the prior art mentioned heretofore and other novel features that result in a solar power system which is not anticipated, rendered obvious, suggested, or even implied by the prior art, either alone or in any combination thereof.

The mechanical thermo-voltaic solar power system (MeT-SoPoS) is a solar power system that uses a mechanical generator instead of the photovoltaic panel commonly in use today. It also incorporates a number of optional advanced features, such as remote light collection, light collector automatic aiming, and a hydrogen (H) based energy storage and retrieval system (ESRS). To attain this, the present invention is essentially comprised of three major subsystems: (1) the collector array, (2) a mechanical thermo-voltaic generator, and (3) a storage and retrieval system. The overall system has a means of monitoring the amount of energy being generated and if that is less than is being used for auto aiming and other nonessential functions, it will shut down those functions and switch into energy retrieval mode.

The solar collection subsystem consists of an array of collector elements, which can be mounted in an area that receives good daylight, such as an open field or a roof. The collector elements are connected to optical conduits (such as standard fiber optic cables) that carry the light energy to the generator. An automatic aiming system is used to align the collector elements directly at the light source (sun). It is possible that this system will be able to use moonlight to generate some power at night as well, particularly in colder climates.

Each collector element consists of an upside-down pyramid shaped enclosure that houses a series of lenses. The lenses focus a larger area of light down to a point small enough to inject into an optical conduit. The largest and outer most of the lenses, the primary lens, is a flat (Fresnel) lens to reduce the overall weight of the structure. The one or more smaller, fine-focus secondary lenses can be standard convex lenses, as they will need to provide more refined focusing. Weight should not be an issue on the fine-focus lenses as they can be quite small.

An optical conduit, such as a fiber optic cable, is used to carry the light from each collector to the mechanical generator. As the number of collectors in the array increase, the optical conduits may become cumbersome to route due to volume. To offset this, fewer collectors with larger primary lenses can be used. An optical combiner can also be used to further reduce the number of conduits running from the array to the generator.

An automatic aiming means is used to point the collector elements directly at the source of light. Up to four photocells, placed at the bottom of opaque cylindrical tubes, are mounted flush with the primary lens on the sides of the collectors, so as to provide the highest output signal when the tubes are aligned directly with the light source. The photocells are attached to servomotors, one for pitch and one for yaw, which are mounted between the base of the collector element and a mounting base plate. An alignment processing circuit (APC) is used to control the servomotors to provide maximum output from the solar collector array. In addition, a separate single stationary photocell can be used to read ambient light levels, indicating activation or deactivation of the auto aiming system, thus switching between the storage and retrieval modes of the system.

Either a steam turbine or a Stirling engine type of mechanical generator is connected to a standard AC generator for generating electrical power. A steam turbine is likely to be considerable less expensive, but a Stirling engine is likely to be considerably more efficient. The heating chamber, encompassing either the boiler of a steam turbine or hot node of a Stirling engine, provides a mounting point for the optical conduits and helps keep the heat on the heating area for either generator type. The heating chamber will involve an outer shell where the optical conduits attach and allow the light to shine through to the heating area. More lenses can be used here to spread the light over the heating area more evenly if necessary. The heating area is covered with a flat black opaque coating to convert as much light to heat as possible. Also, to allow for an auxiliary means of heating, a small hole could be provided in the bottom of the heating chamber, allowing only a minimum amount of heat to escape, so that a natural gas burner can be placed under the hole to allow for stored energy to be used when output levels get to low. Optionally, a hydrogen (H) based storage and retrieval system can be used to supply hydrogen to the burner to generate electricity in the retrieval mode, if that is more efficient than other technologies, such as fuel cells. Nearly any controllable flammable substance can be used to fuel the system this way, should the collectors fail for any reason.

In the system, electricity that is not used immediately is redirected to the storage unit. Any number of storage and retrival systems can be used with MeTSoPos, including the most common storage method used in home power systems today, lead acid batteries. With this, and other chemical electricity storage and retrieval systems, electricity is used directly to charge the batteries and then is taken directly from the batteries when needed.

In a hydrogen based system, the electricity, heat, or both would be used to split water into hydrogen (H) and oxygen (O) (using, for example, the method of U.S. Pat. No. 5,973,825 to Lasich, incorporated herein by reference). The hydrogen is stored until the system is switched to retrieval mode where the hydrogen gas is used to fuel the burner of the mechanical generator, or is fed into fuelcells, to generate electricity.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new mechanical thermo-voltaic solar power system that provides in the apparatuses and methods of the prior art some of the advantages thereof, while simultaneously overcoming some of the disadvantages normally associated therewith.

It is another object of the present invention to provide a new and improved mechanical thermo-voltaic solar power system that may be easily and efficiently manufactured and marketed.

An even further object of the present invention is to provide a new and improved mechanical thermo-voltaic solar power system that has a low cost of manufacture with regard to both materials and labor, and which accordingly is then susceptible of low prices of sale, thereby making such solar power system apparatus economically available for public and consumer use.

Lastly, it is an object of the present invention to provide an improved method for automatically aligning the light collector array to receive maximum energy and improved efficiency from the light source.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description males reference to the annexed drawings wherein.

The same reference numerals refer to the same parts throughout the various figures.

DESCRIPTION OF THE PREFERRED EMBODIMENT

Figure 1:
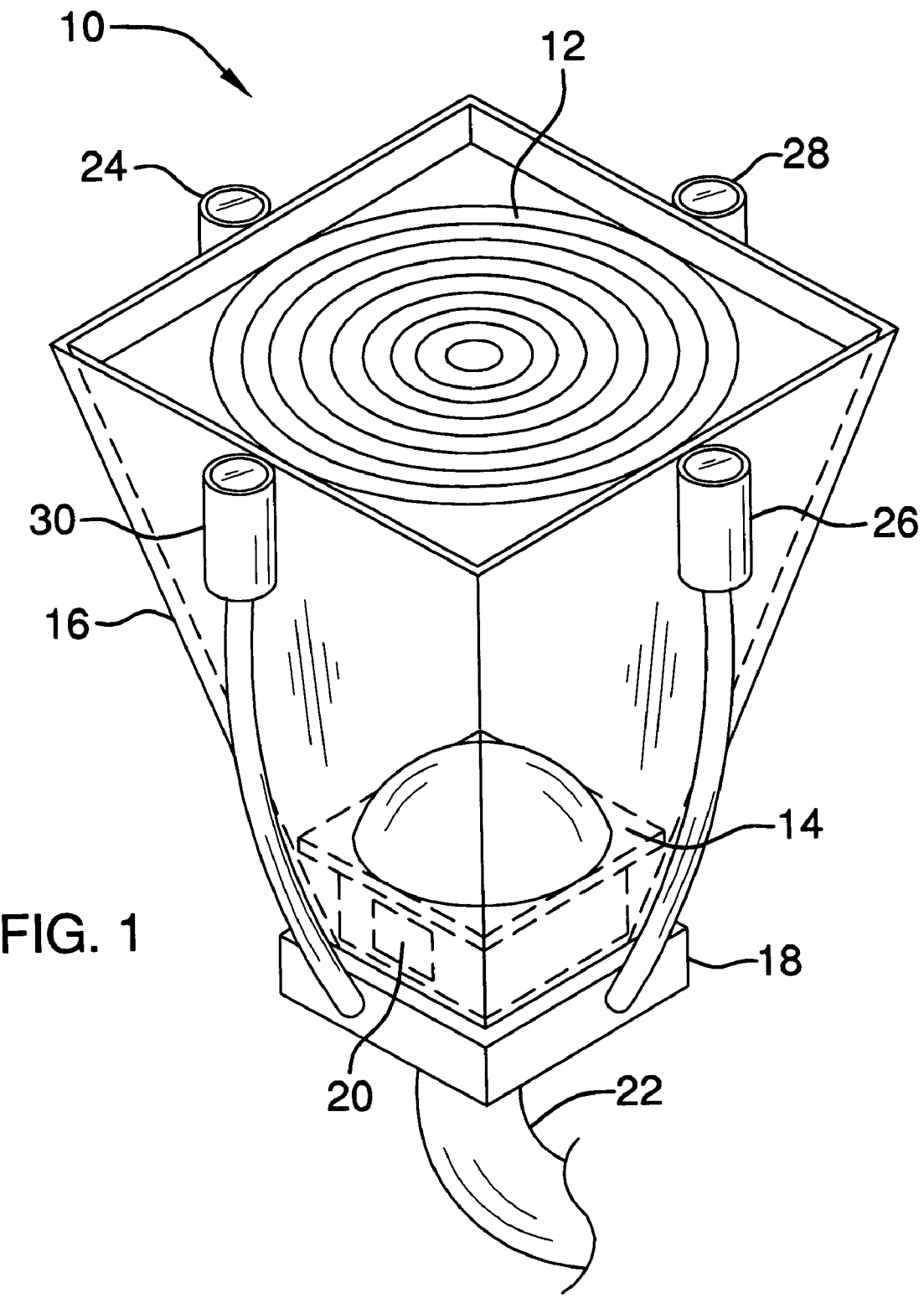
FIG. 1 is a perspective drawing of the solar collector element used in the preferred embodiment of the mechanical thermo-voltaic solar power system constructed in accordance with the principles of the present invention.

Referring now to the drawings, and particularly to FIGS. 1-4, a preferred embodiment of the mechanical thermo-voltaic solar power system of the present invention is shown and generally designated by the reference numeral 10.

FIG. 1 is a perspective drawing of the light collection element 10 used in the preferred embodiment of the mechanical thermo-voltaic solar power system constructed in accordance with the principles of the present invention. The system is essentially comprised of three major subsystems: (1) the solar collector array, (2) a mechanical thermo-voltaic generator, and (3) a storage and retrieval system, with the solar collector array along with the combination of these three subsystems being central to the invention. More particularly, the solar collector array is comprised of an area array of light collector elements 10, which can be mounted in an area that receives good daylight, such as an open field or a roof. Each collector element 10 is comprised of an upside-down pyramid shaped enclosure 16 that houses a series of lenses 12,14. The lenses focus a larger area of light down to a point small enough to inject into an optical conduit 22. The largest and outer most primary lens 12 is a flat lens to reduce the overall weight of the structure. The one or more smaller, fine-focus secondary lenses 14 can be standard lenses, as they will need to provide more refined focusing. Weight should not be an issue on the fine-focus lenses as they can be quite small. The optical output of the secondary lens 14 is coupled to an optical conduit 22, such as a fiber optic cable, for carrying the light energy to a mechanical generator. As the number of collectors in the array increase, the optical conduits may become cumbersome to route due to volume. To offset this, fewer collectors with larger primary lenses can be used. An optical combiner may also be used to further reduce the number of conduits running from the array to the generator. The collector element also includes up to four photocells, a top photocell 24, bottom photocell 26, right photocell 28, and left photocell 30, which are mounted to a servomotor subassembly 18 and used to precisely aim the collector element directly at a light source. Also, an adjustment processing circuit (APC) is included within the servomotor subassembly 18 to control the automatic aiming process.

Figure 2:
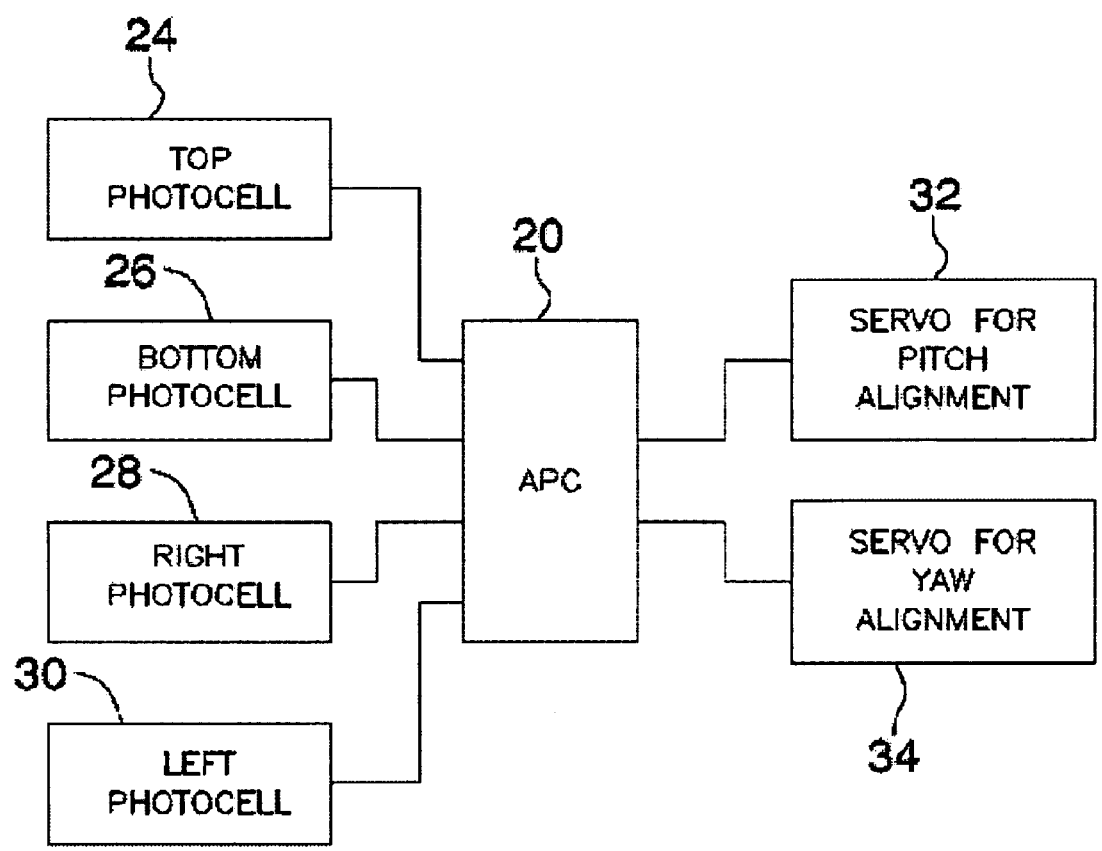
FIG. 2 is a block diagram for the automatic aiming assembly used with the light collection system in the mechanical thermo-voltaic solar power system of the present invention.

FIG. 2 is a block diagram for the automatic aiming assembly used with the light collection system in the mechanical thermo-voltaic solar power system of the present invention. This automatic aiming means is used to point the collector elements directly at the source of light. Up to four photocells, a top photocell 24, bottom photocell 26, right photocell 28, and left photocell 30, located at the bottom of opaque cylindrical tubes, are mounted flush with the primary lens 12 on the sides of the collector elements. For the maximum amount of light to reach the bottom of the cylinder tubes where the photocells are mounted, the cylinders have to be aimed directly it the light source. The photocells are attached to servomotors located in a servo motor subassembly 18, one for pitch alignment 32 and one for yaw alignment 34, which are used to maximize the alignment to provide maximum light collection. The alignment processing circuit 20 (APC) is used to control the servomotors to provide maximum output from the solar collector elements. In addition, a separate single stationary photocell (not shown) is used to read ambient light levels, indicating activation or deactivation of the auto-aiming system, thus switching between the storage and retrieval modes of the system.

Figure 3:
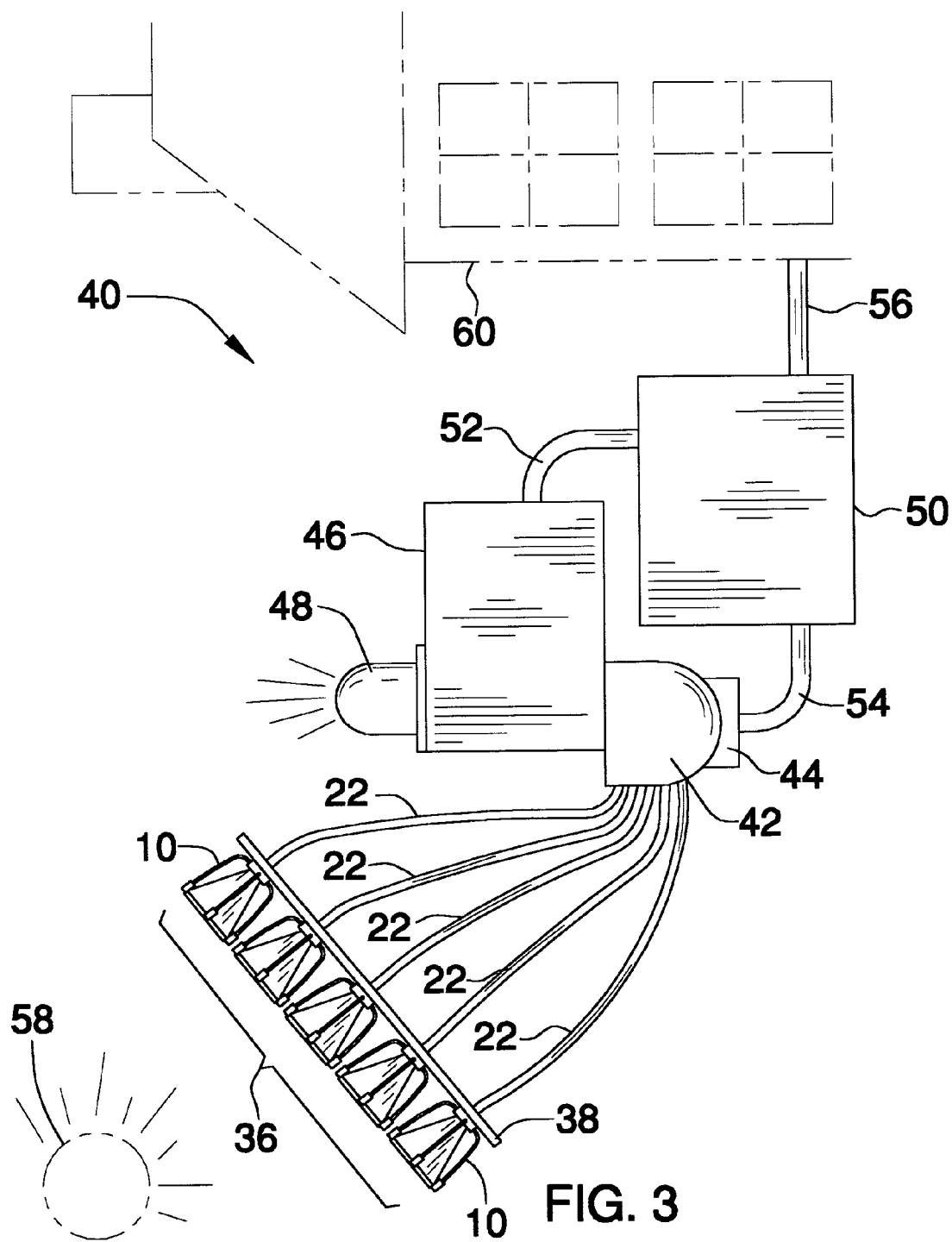
FIG. 3 is a drawing showing the major components of the mechanical thermo-voltaic solar power system constructed in accordance with the principles of the present invention.

FIG. 3 is a drawing showing the major components of the mechanical thermo-voltaic solar power system 40 constructed in accordance with the principles of the present invention. A light collector area array 36, made up of a plurality of light collector elements 10 attached to a solar array mounting board 38, is coupled by means of multiple optical conduits 22 (fiber optic cable or bundles) to the heat chamber 42 of a mechanical generator 46. This mechanical generator can be either a steam turbine or a Stirling engine type generator whose output is coupled to the rotating drive shaft of a standard AC generator for generating electrical power. A steam turbine might be used to provide less expensive systems, while a Stirling engine would likely be used in high efficiency applications. The heating chamber 42, surrounding either the boiler of a steam turbine or the hot node of a Stirling engine, provides a mounting point for the optical conduits 22 to provide the maximum amount of heat transfer from the solar collector array 36, collected from a light source 58, to the heat chamber 42 for either generator type. In the case of a Stirling engine, a cold node 48 is also available on the engine. The heating chamber 42 has an outer shell with transparent windows where the optical conduits attach, thereby allowing the light to shine through to the heating area. Additional lenses can be used in this area of the system to spread the light over the heating area more evenly in order to obtain greater efficiency. The heating area is covered with a flat black opaque coating, except for the conduit openings, to convert as much light-to-heat as possible from the power source 58. Also, to allow for an auxiliary means of heating, a small hole may be provided in the bottom of the heating chamber 42, allowing only a minimum amount of heat to escape, where a burner 44 is placed under the hole to allow for stored energy to be used when output levels of the system get too low. The output of the electric generator is connected through electrical power feed lines 52 to a storage and retrieval unit 50 where the electricity is routed through a distributor to a bank of storage batteries or directly though customer power lines 56 to a house 60 or for use in other applications. Optionally, a hydrogen based storage source can be used to supply fuel through piping 54 to the burner to generate electricity in the retrieval mode.

Figure 4:
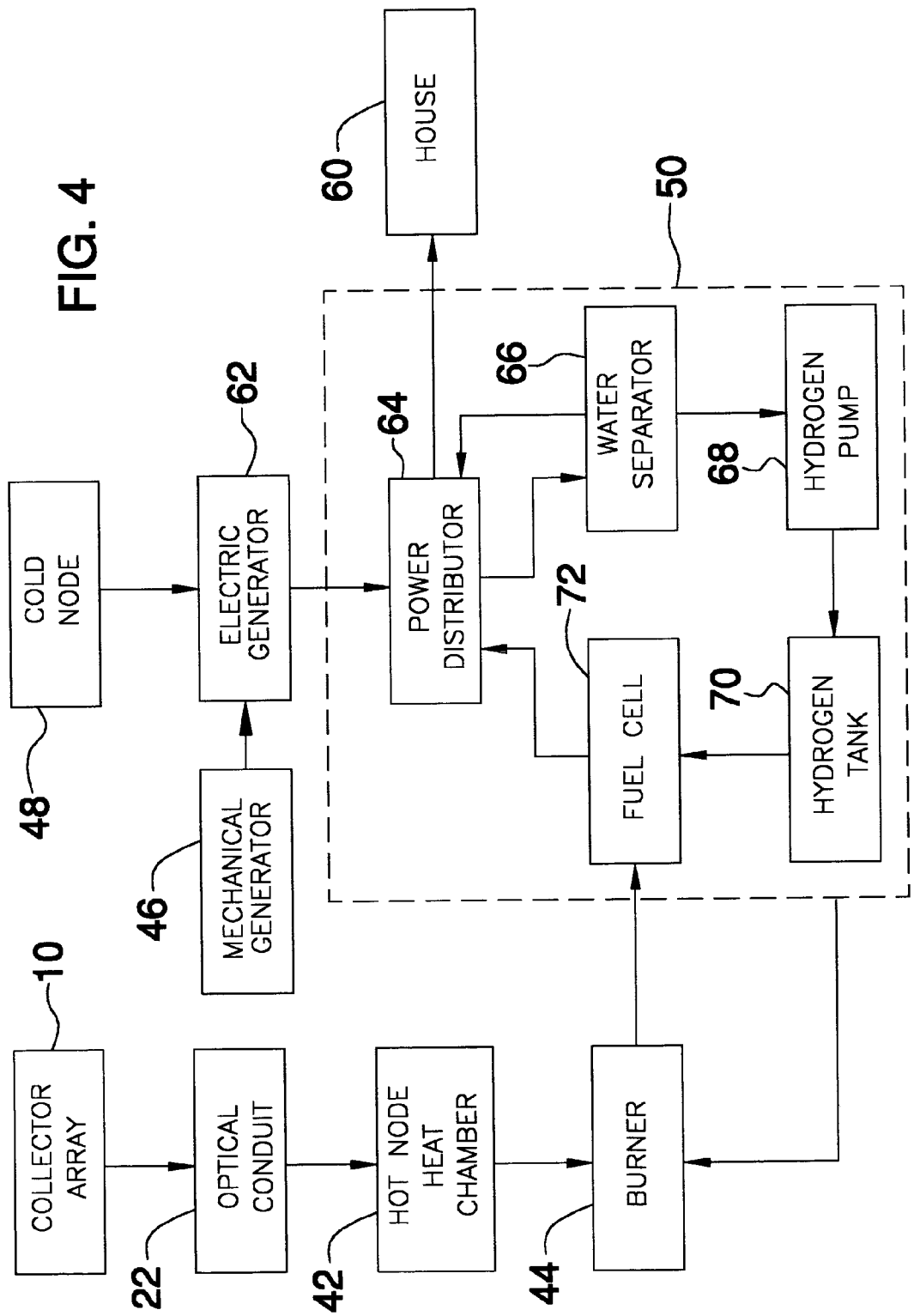
FIG. 4 is a block diagram for the mechanical thermo-voltaic solar power system of the preferred embodiment of the present invention.

FIG. 4 is a block diagram for the mechanical thermo-voltaic solar power system 40 of the preferred embodiment of the present invention as described in FIG. 3. This shows the output of the solar collector array 10 coupled through optical conduit 22 to the heat chamber 42 side of the mechanical generator 46 with cold node 48. The mechanical output of the mechanical generator 46 is coupled to the electric generator 62, with the AC output of the generator 62 being feed into a power distributor 64 located in the storage and retrieval unit 50. The AC power can be routed directly through customer power lines to a house 60 or other utility user.

Additionally, electrical output from the power distributor 64 is fed to the plates of a water separator 66, which converts water from a supplied water source into hydrogen and oxygen. A hydrogen pump 68 is used to siphon off hydrogen gas, where it is pumped into a hydrogen storage tank 70. Hydrogen from the tank is then used to supply a fuel cell 72, which further supplies electricity back into the power distributor 64. Optionally, hydrogen (H) stored in the hydrogen tank 70 can be supplied through piping 54 to fuel the burner 44 to generate electricity in the retrieval mode. In use, electricity that is not used immediately is redirected to the storage unit. The most common storage unit in use in home power systems today is lead acid batteries, where electricity from the power system 40 is used to charge the batteries and power is then taken from them when needed.

While a preferred embodiment of the mechanical thermo-voltaic solar power system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the larger collection lenses, as well as the small fine-focus lenses can be made of glass or plastic. Rather than fiber optic cables, another material capable of light energy may be employed. Also, both small and large mechanical thermo-voltaic solar power systems of the present invention can be used to supply clean efficient electrical power to most any application, not just to homes.

Therefore, the foregoing is considered as illustrative only of the principles of the invention. Further, since numerous modifications and changes will readily occur to those skilled in the art, it is rot desired to limit the invention to the exact construction and operation shown and described, and accordingly, all suitable modifications and equivalents may be resorted to, falling within the scope of the invention.

What is claimed is:

1. A mechanical thermo-voltaic solar power system, comprising:
    a solar light collector array comprised of a plurality of light collector elements mounted to a mounting board, each said light collector element being further comprised of:
        a primary collection lens for collecting light from a light source;
        one or more secondary fine-focus lens for receiving focused light from said primary collection lens;
        an optical housing for structurally holding said primary and secondary lenses, said housing further enclosing said focused light from said collection lens;
        an optical conduit coupled to the output of said secondary fine-focus lens for delivering collected light to a mechanical generator;
        a light collector alignment means, said alignment means having two or more collector alignment photocells, said photocells being attached to a servomotor subassembly mounted at the base of said light collector element for aiming said light collector element at said light source for maximum light collection; and
        an alignment processing circuit mounted in said servomotor subassembly for automatically aligning said light collector element for maximum output;
    a mechanical generator, said generator comprised of;
        a heat chamber, said heat chamber receiving a plurality of said optical conduits from said light collector array, said conduits connected to said heat chamber by optical attaching means;
        a gas burner mounted below said heat chamber for applying auxiliary heat to said heat chamber; and
        an electrical generator mechanically coupled to a rotatable output of said mechanical generator for providing a source of electrical power; and
    a storage and retrieval unit for receiving electrical power from said electrical generator, said storage and retrieval unit further comprising:
        a power distributor, a first input of said distributor being coupled to the output of said electrical generator, a first output of said power distributor providing electrical power to an application load, and a second output of said power distributor supplying power to the electrodes of a water separator, said water separator being filled with water, said water separator separating said water into hydrogen and oxygen;
        a hydrogen pump, an input of said pump coupled to a hydrogen output of said water separator;
        a hydrogen tank, an input of said tank being coupled to an output of said hydrogen pump, an output of said hydrogen tank being connected to said gas burner for supplying auxiliary heat to said system;
        a fuel cell, an input of said fuel cell being connected to the output of said hydrogen tank, an output of said fuel cell being connected to a second input of said power distributor; and
        an additional stationary photocell sensor for measuring the ambient light level, an output of said additional photocell sensor being used to switch said system between storage and retrieval modes.

2. The assembly of claim 1, wherein said primary collection lens is a large-area flat lens for collecting and focusing said light to a smaller area at the surface of said secondary fine-focus lens.

3. The assembly of claim 1, wherein said optical conduit is further comprised of one or more fiber optic cables.

4. The assembly of claim 1, wherein said alignment photocells are mounted at the bottom of opaque cylindrical tubes, thereby providing a maximum alignment signal when said tubes are aimed directly at said light source.

5. The assembly of claim 1, wherein said servomotor subassembly is further comprised of:
    a first servomotor for aligning for pitch; and
    a second servomotor for aligning yaw.

6. The system of claim 1, wherein said mechanical generator is a Stirling engine, said Stirling engine for use in higher efficiency systems.

7. The system of claim 6, wherein the hot node of said Stirling engine is contained within the heat chamber of said power system.

8. The system of claim 6, wherein said Stirling engine further comprises a cold node.

9. The system of claim 1, wherein said mechanical generator is a steam turbine engine, said steam turbine for use in a lower cost system.

10. The system of claim 9, wherein said boiler of said steam turbine forms the heat chamber of said power system.

11. The system of claim 1, further comprising a bank of batteries wherein unused electricity is stored.

* * * * *